E. M. WRIGHT.
Grain Drill.
No. 49,204.
2 Sheets—Sheet 1.
Patented Aug. 1, 1865.
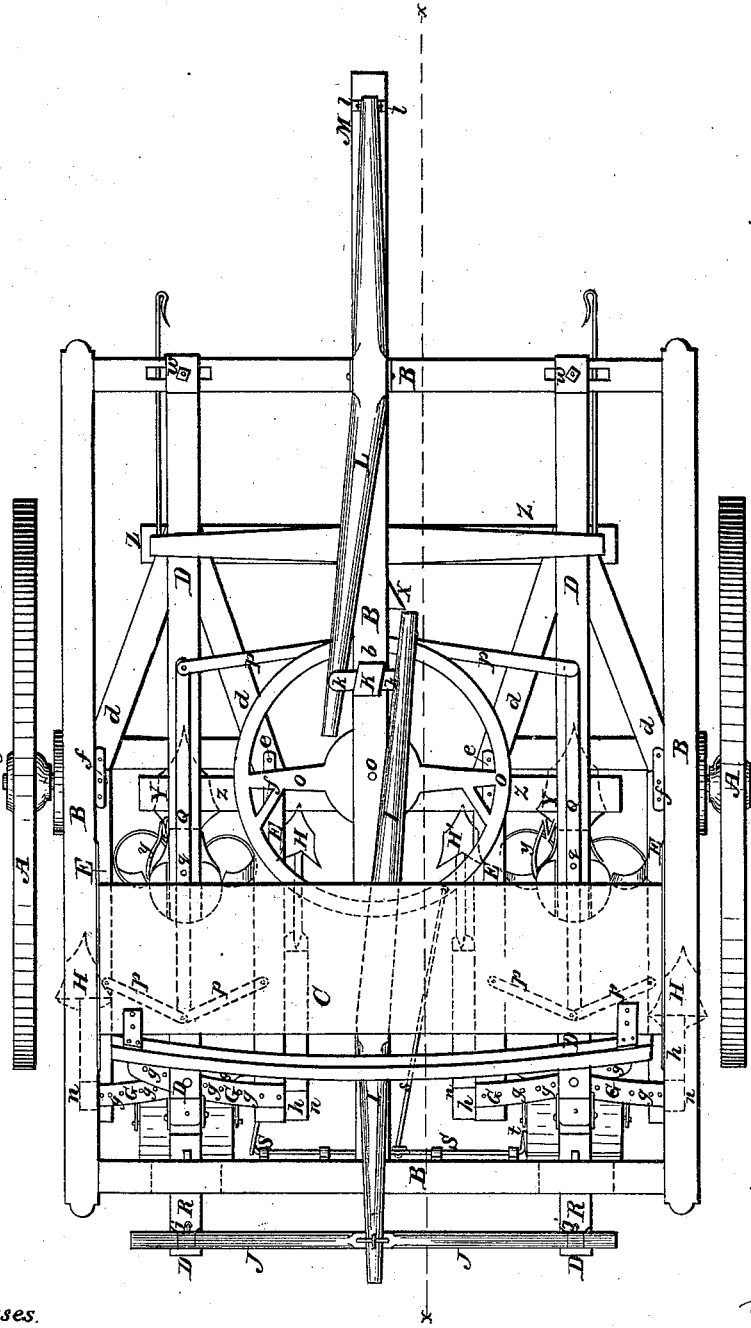

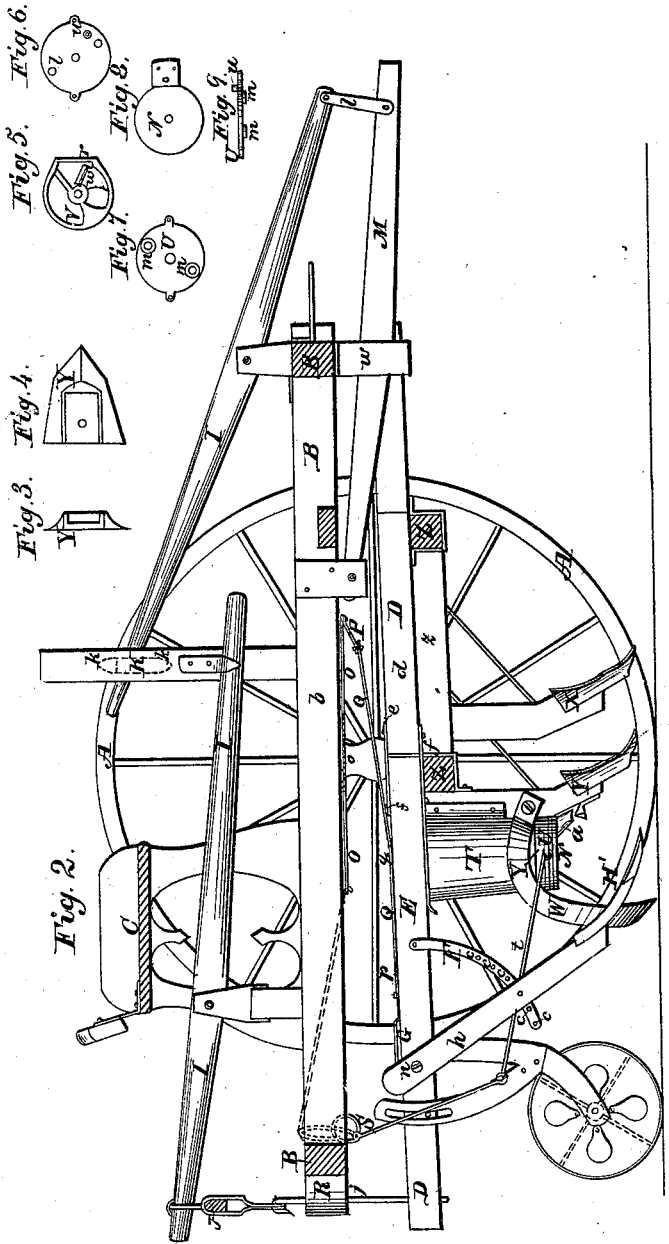

UNITED STATES PATENT OFFICE.

E. M. WRIGHT, OF WILMINGTON, OHIO, ASSIGNOR TO HIMSELF AND A. C. DIBOLL, OF SAME PLACE.

IMPROVEMENT IN CULTIVATORS AND PLANTERS.

Specification forming part of Letters Patent No. 49,204, dated August 1, 1865.

*To all whom it may concern:*

Be it known that I, E. M. WRIGHT, of Wilmington, in the county of Clinton and State of Ohio, have invented a new and Improved Cultivator and Seed-Planter; and I do hereby declare that the following is a full and exact description thereof, reference being had to the accompanying drawings, making part of this specification—

Figure 1 being a plan of the implement; Fig. 2, a longitudinal vertical section thereof in a plane indicated by the line $x\ x$, Fig. 1; Figs. 3, 4, 5, 6, 7, 8, and 9, views of parts detached.

Like letters designate corresponding parts in all of the figures.

The objects of this implement are, first, to cover in wheat, oats, and other seeds sown broadcast on light soils or plowed grounds; second, to furrow the ground to be planted with corn and other seeds, (two rows at a time;) third, to cross-furrow the ground, to drop and cover the corn or other seeds, and to roll the land, if required, all at one operation; fourth, to cultivate Indian corn from its first appearance above ground till it has grown too high to cultivate between the rows, passing through two row-spaces at once, and to cultivate other crops planted in rows.

The implement is mounted on two wheels, A A, the main frame B being composed of two side pieces and two end pieces, with a central longitudinal piece, $b$, substantially as shown in Fig. 1. Under this main frame are situated two smaller frames, each composed of a central longitudinal beam, D, with braced side pieces, $d\ d$, on each side, arranged as shown in Fig. 1, the rear ends of which side pieces, respectively, are jointed to side bars, E E, by means of iron straps $f f$ and pivots $e\ e$, all substantially as shown. To these under frames, respectively, three drill-teeth or shovels are secured by their standards, which drill-teeth or shovels, together with a central foremost tooth or shovel, X, sustained by a connecting-piece, $z$, between two cross-bars, Z Z, reaching from one of the longitudinal beams D D of the said under frames to the other, make seven teeth—the entire number ever used on the implement.

The front ends of the central beams, D D, of the under frames are secured and pivoted in hangers $w\ w$, attached to the front cross-piece of the main frame, and the rear ends thereof, reaching back beyond the rear cross-piece of the main frame, are suspended by means, first, of guide-rods $j j$, (sliding in guide-blocks R R secured to the main frame,) which hook into links on the ends of a cross-bar, J, above; and the said cross-bar is suspended at the middle by a link or connection, $i$, from the rear end of a vibratory lever, I, supported on the main frame. The front end of the lever reaches forward far enough to be under the direct control of the driver as he sits on a seat, C, upon the main frame, so that by means of the lever he can regulate the height of the under frames, and consequently the depth at which the drill-teeth or shovels cultivate or run in the ground. By this means, also, the teeth or shovels are lifted entirely away from the ground. The front end of the lever I may be held down by fastening it under a hook or hooks, $k\ k$, projecting from a standard, K, in front of the driver, whereby the under frames are held up from the ground when desired. The tongue or pole M of the implement is also raised or lowered by its rear end pivoted to the main frame, while its forward end is free to move up or down, so that by means of another lever, L, arranged as shown, its forward end connected with the tongue M and its rear end extending back within reach of the driver, he can control the position of the tongue or pole at will.

The lever can be held in any position by other hooks or projections, $k\ k$, on the standard K. By this means the height at which the front end of the implement runs is determined, and it very greatly assists in regulating the depth at which the teeth or shovels cultivate.

Each of the under frames supports the planting or cultivating apparatus for one row, and the distance between the central beams thereof, D D, determines the distance between the rows. In order to accommodate this distance apart to the actual or desired distance between the rows of corn, the said central beams are made adjustable laterally under the main frame. To accomplish this the hangers $w\ w$, which support their front ends, are made adjustable in vertical slots of the front cross-piece of the main frame, as shown in Fig. 1, and the guide-blocks R R, which determine the position of the rear ends of the beams D D, are made adjustable in horizontal slots in the rear cross-piece of the main frame, as indicated by dotted lines in the same figure.

The forward tooth or shovel, Y, of the three attached to each of the under frames is secured to the central beam, D, by its standard. The two rear ones, H H', are secured respectively to the side pieces, E E, of each frame by their standards h h. These standards are pivoted at n n, Fig. 2, to the pieces, so that their angles thereto can be varied at pleasure to vary the obliquity and depth of the teeth or shovels H H'. To hold these standards firmly in any position curved braces or arms F F are used, which are secured to the beams at their upper ends and extend downward and backward thence through mortises or apertures in the standards, and there is a set of holes, c c, in the curved arms, through any one of which a wooden pin may be passed behind or through the standards, thereby preventing the standards from being forced backward unless a strong obstruction encounters the teeth or shovels, which would otherwise break or injure the said teeth or shovels, but in this case breaks the wooden pins, thus allowing the standards to swing back and free the teeth or shovels from the obstruction.

For the purpose of general cultivation, or for covering in grain sown broadcast, the teeth H H' Y of the under frames are set at equal distances apart and require no change nor adjustment, and these six, together with the seventh tooth or shovel, X, situated centrally between the under frames and farther forward than any of the other teeth, all the distances apart being nearly or quite equal, serve the purpose of such cultivator without additional parts or arrangement. To keep the hinges, side pieces, or beams E E firmly in one position for these purposes, bars G G extend from near their rear ends inward upon or through mortises in the central beam, D, overlapping each other, as shown in Fig. 1. These bars are provided with sets of equidistant holes g g, through which a pin or bolt, passing also down through the middle beam, D, adjusts and holds the beams E E in any fixed position; but for cultivating between the rows of corn it is desirable, if not necessary, to have these side beams constantly adjustable nearer to or farther from the center of the frame in order to accommodate the teeth H H' to any short crooks in the rows, or to any side swerving of the implement, or to avoid any obstacle in the way, and this adjustment must be under the immediate and continual control of the driver as he sits on the seat. To effect this purpose I employ the following device:

Under the center piece, b, of the main frame a wheel, O, is pivoted at o. This wheel is so situated that the driver's feet rest upon it, bearing against two of its spokes. (Shown in Fig. 1.) By this means the driver can turn it in its horizontal plane in either direction, pushing with either of his feet, as the case may require, or holding it stationary by bearing with equal force against the opposite spokes.

Upon each central beam, D, of the under frames a lever, Q, is situated and vibrates on a pivot, q, as shown in Fig. 1. The rear end of this lever is connected with the side pieces or beams, E E, by bars p p, substantially as shown by dotted lines in the same figure. These connecting-bars may be adjustable, so as to adjust the side pieces or beams, E E, nearer to or farther from the central beam, D. The front end of each lever Q is connected with the governing-wheel O by a connecting rod or bar, P, which is pivoted both to the lever and to the wheel. By vibrating the wheel O on its axis the two levers Q Q are simultaneously vibrated, and consequently the side pieces or beams, E E, of both under frames are vibrated equally and all in the same direction. For planting, the wheel O is also employed to enable the driver to plant by cross-furrows, just the same as with a planting-plow, while walking behind the same. The method of doing this is thus:

The connecting-rods P P are detached and the side pieces or beams, E E, are fixed in stationary positions by the bars G G, the same as for general cultivation; or the side teeth or shovels, H H', are removed.

I employ a dropping apparatus similar to that described in a previous application for Letters Patent for a single-plow corn-planter, and I shall only describe such portions thereof here as will be necessary to show the application thereof to the present implement, and to set forth some improvements thereon as here presented. The vibratory seed-dropping wheel U, Figs. 2, 6, 7, and 9, works the same as in my previous invention, and to operate the seeding apparatus it is only necessary for the driver to vibrate this wheel at the moments of passing over the cross-furrows. The connection between this dropping-wheel and the governing-wheel O is made by means of a rock-shaft, S, with an arm projecting upward, which is connected with the wheel O by a flexible connecting-rod, s, and as many arms projecting downward as there are dropping-wheels U U, each of which is connected with its arm by a flexible connecting-rod, t. The relative lengths of the upwardly and downwardly projecting arms are such as to produce the requisite vibrations of the seed-wheels U U by a convenient extent of vibration given to the wheel O.

The return-vibration of the wheels U U may be produced automatically by a spring, y, as shown in Fig. 1, or arranged in any other suitable manner; but the motions of the seed-wheels may be produced in both directions by operating the wheel O both ways simply with stiff connecting-rods.

In order to render the vibratory motion of the dropping-wheels U U easy with as little friction as possible, two or three rounded projections, m m, are formed on the bottoms thereof, as shown in Figs. 7 and 9, which represent a bottom and an edge view of a wheel respectively. These projections rest on the supporting-plate N below.

The extent of vibratory movement given to the wheels U U is limited by a projection, u, on the upper side of each, as in Fig. 6 (a top view of a wheel) and Fig. 9. This projection strikes partition-plates extending across the bottom of the spiral seed-separator V, a bottom view of which is shown in Fig. 5.

The spiral separator has a projecting ledge, v, extending forward from the brush w, as shown, so as to prevent the corn or grains from "arching" over the dropping-wheel, as is frequently the case with other dropping devices, so that the dropping ceases for a time; but this simple arrangement effectually prevents all such obstructions.

There is a thin friction-plate, r, Fig. 5, between the brush w' and its fastening-wedge, whereby the brush is protected from disarrangement when it is fastened in place.

The hopper T is secured under the central beam, D, of each under frame, and to the standard of the forward tooth or shovel, Y, of said frame.

A curved piece of sheet metal, a, Fig. 2, called a "staple," serves for assisting to fasten the supporting-plate N to the standard by the flange thereof, and this staple and the flange compose a tube for conducting the seed down upon the adjustable scatterer below.

The standard of the tooth or shovel Y has a bend at the proper point, so as to give the right inclination forward at the bottom, while the upper part is vertical, and the seed-dropping apparatus is adapted thereto.

The seed is covered after dropping by shovels W, Fig. 2, of a claw-like form, substantially as represented, they being attached to the standard of the furrow-opening tooth or shovel Y, and reaching back behind the seed-dropping apparatus. They draw the moist mellow soil over the seeds before the sods can roll in upon the same and impede their coming up.

Behind the covering-claws rollers graduated in weight follow, if the soil is suitable, and they may be adjustable in height so as to cover to any depth required.

The drill-teeth or shovels are attached to their standards by sockets or mortises, as shown in Figs. 3 and 4, which fit over the lower ends of the standards, so that they are held very firmly in place, and they strengthen the standards. The teeth or shovels are of chilled iron and are self-sharpening.

The inner tooth or shovel, H', of each under frame, as shown in the drawings, is made of "dart-head" form. This is used only in cultivating young corn or crops. It runs closely to the young corn, and from its peculiar shape it runs under the surface of the ground, stirring it up without turning it over or injuring the corn.

What I claim as my invention, and desire to secure by Letters Patent, is—

1. The construction and arrangement of the under cultivator-frames, composed, respectively, of long central beams, D D, fixed but adjustable in position, and of short side pieces or beams, E E, hinged and movable or adjustable to and from the said central beams, substantially as and for the purposes herein specified.

2. The governing-wheel O, arranged and operating substantially as and for the purpose herein specified.

3. The combination of the governing-wheel O and the side pieces or beams, E E, of the under frames through the means of the levers Q Q, connecting-bars p p, and rods or bars P P, all substantially as herein described.

4. Operating the seed-dropping wheels U U by the governing-wheel O, under the control of the driver, by means of the lever-armed rock-shaft S and flexible connecting-rods s s and t t, or their equivalents, substantially as herein specified.

5. The projecting ledge v in the spiral seed-separator, substantially as and for the purpose herein set forth.

6. The friction-plate r between the brush w' and its fastening-wedge, for the purpose specified.

7. The construction of the drill-teeth or shovels, with sockets or mortises fitting over their standards, for the purpose specified.

The above specification of my improved cultivator and seed-planter signed and witnessed this 10th day of December, A. D. 1864.

E. M. WRIGHT.

Witnesses:
JAMES A. BROWN,
JEFF. HILDEBRANT.